United States Patent
Libin (10) Patent No.: US 11,929,095 B1
(45) Date of Patent: Mar. 12, 2024

(54) SPEED ADJUSTMENT OF RECORDED AUDIO AND VIDEO TO MAXIMIZE DESIRABLE COGNITIVE EFFECTS FOR THE AUDIENCE

(71) Applicant: mmhmm inc., Little Rock, AR (US)

(72) Inventor: Phil Libin, Bentonville, AR (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/852,445

(22) Filed: Jun. 29, 2022

Related U.S. Application Data (60) Provisional application No. 63/223,593, filed on Jul. 20, 2021.

(51) Int. Cl.
  *G11B 27/00* (2006.01)

(52) U.S. Cl.
  CPC .................................. *G11B 27/005* (2013.01)

(58) Field of Classification Search
  None
  See application file for complete search history.

(56) References Cited

U.S. PATENT DOCUMENTS

| | | | | |
|---|---|---|---|---|
| 2007/0223873 | A1* | 9/2007 | Gilbert | H04N 7/163 |
| | | | | 386/E5.052 |
| 2018/0035163 | A1* | 2/2018 | Thomas | H04N 21/83 |
| 2019/0014378 | A1* | 1/2019 | Shah | H04N 21/47217 |
| 2020/0043511 | A1* | 2/2020 | Raikar | G10L 21/055 |

* cited by examiner

*Primary Examiner* — Girumsew Wendmagegn
(74) *Attorney, Agent, or Firm* — Muirhead and Saturnelli, LLC (57) ABSTRACT

Setting a replay speed of a pre-recorded video presentation includes determining a mood of a presenter of the pre-recorded video presentation, determining complexity of material that is presented in the pre-recorded video presentation, and setting a replay speed based on the mood of the presenter and the complexity of the material that is presented. Setting a replay speed of a pre-recorded video presentation may also include adjusting the replay speed based on determining a desired speech tempo for a listener. The desired speech tempo of the listener may be based on time of day, age of the listener, and/or comprehension level of the listener. Measuring the comprehension level of the listener may be based facial expressions of the listener, eye-tracking of the listener, and/or listener comprehension quizzes. Measuring the mood of the presenter may be based on facial recognition, sentiment recognition, and/or gesture recognition.

20 Claims, 7 Drawing Sheets

SPEED ADJUSTMENT OF RECORDED AUDIO AND VIDEO TO MAXIMIZE DESIRABLE COGNITIVE EFFECTS FOR THE AUDIENCE

CROSS-REFERENCE TO RELATED APPLICATIONS

This application claims priority to U.S. Prov. App. No. 63/223,593, filed on Jul. 20, 2021, and entitled "AUTOMATIC SPEED ADJUSTMENT OF RECORDED AUDIO AND VIDEO TO MAXIMIZE DESIRABLE COGNITIVE EFFECTS FOR THE AUDIENCE", which is incorporated herein by reference.

TECHNICAL FIELD

This application is directed to the fields of audio-visual communications and user interfaces, and more particularly to the field of replaying pre-recorded audio-video presentations with automatic speed adjustment aimed at maximizing favorable cognitive effects of the audience.

BACKGROUND OF THE INVENTION

Online and local video content is quickly gaining the position of a dominant productivity medium in many areas, including instructional materials, education, marketing, e-commerce, product support and development, business communications and presentations, etc. Just the worldwide market size of video marketing had the value of $33.3 billion in 2020 and is expected to reach to reach $45.6 billion by 2025. Seventy-eight percent of Internet users watch videos online every week, while 55% watch online videos daily. Additionally, 96% of Internet users watch explainer videos to learn more about a product or service.

The 2019 global average of video consumption per day was 84 minutes, led by China and Sweden, whose populations spent 103 minutes per day watching online videos. The global average has increased year-to-year and hit approximately 100 minutes per day in 2020. The most common types of video content are explainer videos (73%), social media videos (67%), video presentations (51%), sales videos (41%) and video ads (41%).

Recently introduced new methods of video presentations include interactive immersive videos, such as mmhmm developed by mmhmm inc., where a presenter or a group of presenters appear before or behind the presented materials and may enhance presentations by pointing to presentation content, changing size, location, and other attributes of presenter's image, for example, color and transparency, adding audio and video signs of emphasis, exaggerated gestures, etc.

An important attribute of a video presentation is a presenter's talking speed, or speech tempo. Intelligibility, emotional effect, memorizing the presented materials and time taken to listen and watch a video presentation all depend on the speech tempo. Compared with other types of verbal communications, presentations have a broader range of talking speeds estimated as 100-150 wpm (words per minute); in comparison, the range of conversational speech tempos is 120-150 wpm and audiobooks are normally delivered at 150-160 wpm. The reasons for the speed difference include complexity of presentation content, changing emotional state of the presenter and specifics of the presenter's speech.

It is known that moderate adjustments of the speech tempo (especially acceleration of the tempo) may bring favorable effects to audio-video and purely audio presentations. The presentation often sounds more energetic and enthusiastic and comprehensibility of the presentation does not suffer or even improves, while time savings may be significant. Most video repositories and replay systems (YouTube, Spotify, Facebook Live) have replay acceleration features, typically a range of acceleration ratios or a continuous acceleration scale, while Audacity has a dedicated Play-at-Speed Toolbar. Microsoft has developed an AIR (Accelerated Instant Replay) system for videoconferencing that enables users to catch up on missed content while the meeting is ongoing.

SUMMARY OF THE INVENTION

Notwithstanding the progress in managing audio speed adjustment, the existing methods of accelerating video presentations require significant improvements. The problems of automatic replaying of presenter's speech at a constant tempo, optimization of the adjusted speed for presentation complexity, presenter's mood, and speech specifics, as well as customization of adjustment for the environmental and listener's individual characteristics have not been addressed.

Accordingly, it is important to develop techniques and systems for automatic optimal adjustment of recorded audio and audio-video for maximizing cognitive effects for the audience.

According to the system described herein, setting a replay speed of a pre-recorded video presentation includes determining a mood of a presenter of the pre-recorded video presentation, determining complexity of material that is presented in the pre-recorded video presentation, and setting a replay speed based on the mood of the presenter and the complexity of the material that is presented. Setting a replay speed of a pre-recorded video presentation may also include adjusting the replay speed based on determining a desired speech tempo for a listener. The desired speech tempo of the listener may be based on time of day, age of the listener, and/or comprehension level of the listener. Measuring the comprehension level of the listener may be based facial expressions of the listener, eye-tracking of the listener, and/or listener comprehension quizzes. Measuring the mood of the presenter may be based on facial recognition, sentiment recognition, and/or gesture recognition. Setting a replay speed of a pre-recorded video presentation may also include accelerating the replay speed in response to the presenter changing from a serious and thoughtful mood to an excited and enthusiastic emotional state. The complexity of the material that is presented in the pre-recorded video presentation may be based on readability criteria for recognized text of the presentation, complexity of visual portions of the presentation, and/or intensity of interaction of the presenter with the visual portions of the presentation. The pre-recorded video presentation may be divided into a plurality of segments and each of the segments may be provided with a replay speed that is independent of a replay speed of different ones of the segments. The segments may be determined based on a relationship between an actual speech tempo of the presenter, an emotional state of the presenter and the complexity of the material that is presented. The actual speech tempo of the presenter may be determined using a sliding average window having a width between 20 seconds and 30 seconds. Setting a replay speed of a pre-recorded video presentation may also include adjusting the replay speed based on timber of speech of the presenter, intelligibility of the speech of the presenter, and/or intonation of the speech of the presenter. The replay speed may be optimized according to feedback from a plurality of users playing one or more test video presentations at a plurality of replay speeds. The replay speed may be optimized using an experimental space that is a multi-dimensional parallelepiped with a parameter subspace and an axis for revised values of the replay speed. The parameter space may correspond to the mood of the presenter of the pre-recorded video presentation and the complexity of the material. The plurality of users may be presented with different combinations of replay speeds, material complexity, and presenter moods. The feedback from the plurality of users may be aggregated into a quality function that represents preferences of the users for various combinations of replay speeds, material complexity, and presenter moods. The replay speed may be iteratively reset according to the mood of the presenter and the complexity of the material that is presented until an integrated consistency criteria is met. The integrated consistency criteria may be based, at least in part, on a percentage of newly misrecognized words, an overall drop in speech recognition accuracy, and/or deviation in recognized emotional states. The listener may choose whether to replay the pre-recorded video presentation at a constant acceleration or at the replay speed that is set based on the feedback from the plurality of users.

According further to the system described herein, a non-transitory computer readable software medium contains software that sets a replay speed of a pre-recorded video presentation. The software includes executable code that determines a mood of a presenter of the pre-recorded video presentation, executable code that determines complexity of material that is presented in the pre-recorded video presentation, and executable code that sets a replay speed based on the mood of the presenter and the complexity of the material that is presented.

The proposed system determines optimal levels of the accelerated speech tempo for an audio-video recording as a function of multiple factors, including presentation complexity, the mood of a presenter and individual characteristics of speech of the presenter; offers a scoring engine to determine optimal adjusted speech tempo based on dynamic scores; measures complexity and the mood of the presenter during a recorded presentation based on speech, facial, gesture and sentiment recognition; segments a recording based on speech tempo of the recording and the values of each factor; detects optimal adjustment of the speech tempo for a recording; offers an iterative consistency test for additional adjustments to optimal speech tempo based on individual voice characteristics of a speaker; offers a listener a constant adjusted speech tempo for the whole recording or an optimal speech adjustment dynamics through a segmented recording; and customizes adjusted replay speed based on environmental parameters and individual characteristics of a listener, including age of the listener and dynamically measured comprehension level.

Various aspects of system functioning are explained as follows.

1. The system determines a set of universal optimal levels of the accelerated speech tempo for audio-video recordings using a combination of experimental design and user response through the following:
   a. An experimental design is built in a multi-dimensional space that includes
      i. Quantified levels of parameters $\{p_i^j\}$ influencing an adjusted speed tempo, such as presentation or explanation complexity, emotional state and mood of a presenter, etc.
      ii. Acceleration coefficients for adjusted speech tempo $\{\Delta_k\}$, which are varied for each combination of the parameters.
   Experiments are represented by a set of points $\{r_m=(p_i^j, \lambda_k)\}$ in a multi-dimensional parallelepiped.
   b. For each experiment under a plan (a specific combination of parameters and an acceleration coefficient), a recording is produced or extracted from a repository that satisfies the combination, i.e., has the set of parameters and the acceleration coefficient defined by the experiment.
   c. A set of users is recruited for listening and viewing the recordings and providing feedback, which may be a binary thumbs-up/thumbs-down response or a more nuanced scale of preferences.
   d. Each experiment is conducted by offering a subset of users to listen and view the associated recording and provide feedback, which results in a set of user responses $\{r_m\} \rightarrow \{n_m^+, n_m^-\}$ (for a binary feedback), where the counts of positive and negative user responses are subsequently transformed into quality estimates of experiments $q(r_i)=\varphi(n_i^+, n_i^-)$ based on a response aggregation function $\varphi(\bullet, \bullet)$.
   e. The graph of the quality function over the experiment space $q=f(\Lambda, P)$ or $q=f(V, P)$ is obtained via regression analysis or other statistical processing (or extrapolation) mechanisms. Optimal acceleration coefficients or adjusted speech tempo values for each combination of parameters are defined from the equation for the scoring function $$V^*(P) = \arg\max_V q(V,P)$$

2. Prior to publishing, a new recorded audio/video presentation (recording) is replayed and analyzed by the system using a technology stack including speech recognition, facial, sentiment and gesture recognition, and technologies for assessing presentation complexity, as explained below.
3. The mood of the presenter and complexity of the presentation material through the recording may be continuously assessed using various mechanisms, such as facial, sentiment and gesture recognition for the mood assessment; readability criteria for the recognized text (Flesch Reading Ease, Gunning Fog Scale Level, Dale-Chall Score, etc.), complexity of the visuals (slides and other illustrations) and intensity of interaction of the presenter with the visuals for the complexity assessment, etc.
4. A graph of the actual talking speed of the presenter for the recording is built with a sliding averaging filter, such as a 20-30 sec. by processing speech recognition output or using other mechanisms for calculating speech tempo.
5. If the graph of actual talking speed and the values of other parameters, such as complexity and presenter emotional state, show a significant swing, the recording may be split into segments with smaller value changes.
6. For each segment of the recording, or for the whole recording in case the recording has not been divided into segments, integrated assessments of mood and complexity are calculated and subsequently converted into the integrated complexity/mood score using the scoring function explained elsewhere herein.

7. Integrated score values determine the optimal adjusted speech tempo for each segment and may be associated with different acceleration coefficients for different segments.
8. The influence of additional factors, such as the individual characteristics of speech of the presenter, including timber, intelligibility, and intonation, may be dynamically assessed through an iterative consistency test. According to the test, the modified presentation built through the sequence of steps 2-7, is replayed to the system, and analyzed again using the steps 2-4. Speech and emotional state recognition is repeatedly performed and the results are compared with results for the original recording, using partial or integrated consistency criteria, such as the percentage of newly misrecognized words, an overall drop in speech recognition accuracy, deviation in recognized emotional states, etc.

If the integration consistency metrics fall below a required threshold, the adjustment is deemed unfit and a newly modified recording is produced where the previous acceleration coefficients for the inconsistent segments are slightly lowered. The consistency test is then repeated, and the iterative procedure goes on until the modified accelerated recording is found sufficiently consistent with the original recording.

9. Steps 2-8 produce an optimal adjusted version of a new recording in terms of the speech tempo; the optimal version is stored next to the original recording.
10. A new user (listener) desiring to adjust the original recording and play the original recording at an accelerated speech tempo to save time, quickly catch up with missed materials and enjoy benefits of a more emotional speech may have several scenarios to choose from:
    Define a constant speech tempo for the listener and adjust the original recording to the constant tempo of the listener. This may cause the system to replay the original recording with variable speech acceleration coefficients for different portions of the recording.
    Use a traditional approach with constant acceleration ratios.
    Use optimal adjusted version of the original recording.
    Customize the optimal version to consider environmental and listener related factors. Environmental factors may include time of the day, weather, sun activity, etc., while listener related factors include age, daily routine, and comprehension level. Listeners may be offered comprehension quizzes that may be used for instant modifications of the speech tempo or for collecting training material for the subsequent machine learning. One type of comprehension quizzes may incorporate controls of the listener to make the recording slower or faster. The system may also use facial and gesture recognition of the listener to assess the attention concentration and the comprehension level.
11. In addition to speech tempo adjustments, the system may also adjust the volume of the recording using similar scenarios to create the best cognitive effect for the users.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a technique, system, workflow, and user interface for an automatic adjustment of the speech tempo for a pre-recorded video, providing variable speed adjustment levels for different segments of a video presentation based on factors defining legibility and comprehensibility of presenter talk and user perception of the video replay.

Figure 1:
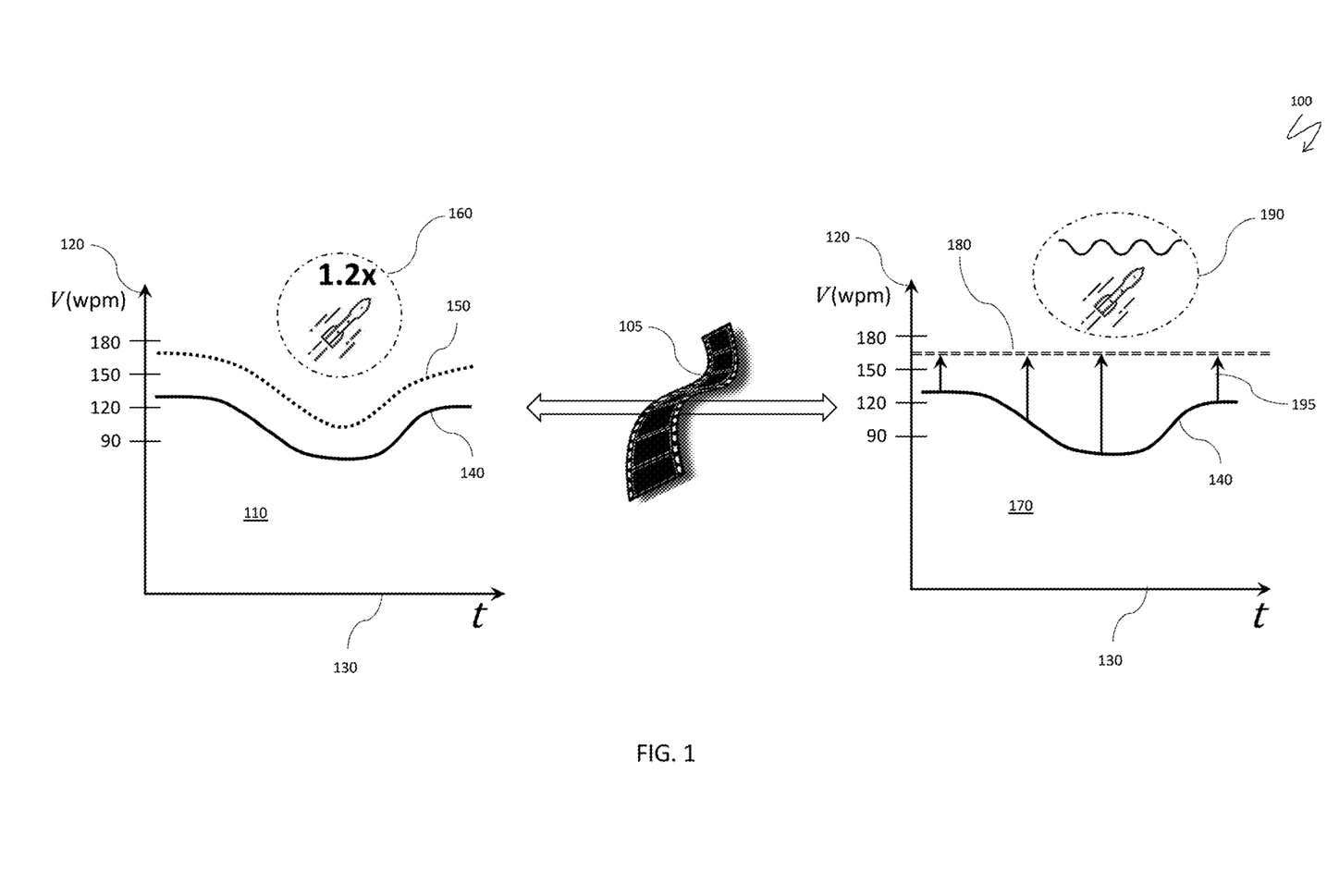
FIG. 1 is a schematic illustration of a traditional and new speech tempo adjustment mechanisms for audio-video recordings, according to an embodiment of the system described herein.

FIG. 1 is a schematic illustration 100 of traditional and new speech tempo adjustment mechanisms for a pre-recorded audio-video presentation 105. A traditional speech tempo graph 110 shows values of talking speech 120, measured, in the graph 110, in wpm (words per minute) units over a timeline 130. An original speech tempo 140 may be modified to a new speech tempo 150 (in this example, an accelerated speech tempo) by applying a constant acceleration rate (coefficient) 160, which uniformly applies to the original speech tempo until replaced with another available acceleration rate.

In contrast, a new method of adjusting speech tempo for the audio-video presentation 105 is shown on a talking speed graph 170 with the same coordinate system (talking speed/time) and the same curve as the original speech tempo 140. However, unlike the highly variable modified talking speed 150 repeating the variations of the original speech tempo 140, the system builds a constant speech tempo 180 with a dynamic acceleration rate 190; variations of the acceleration rate over time are shown by arrows 195.

Figure 2:
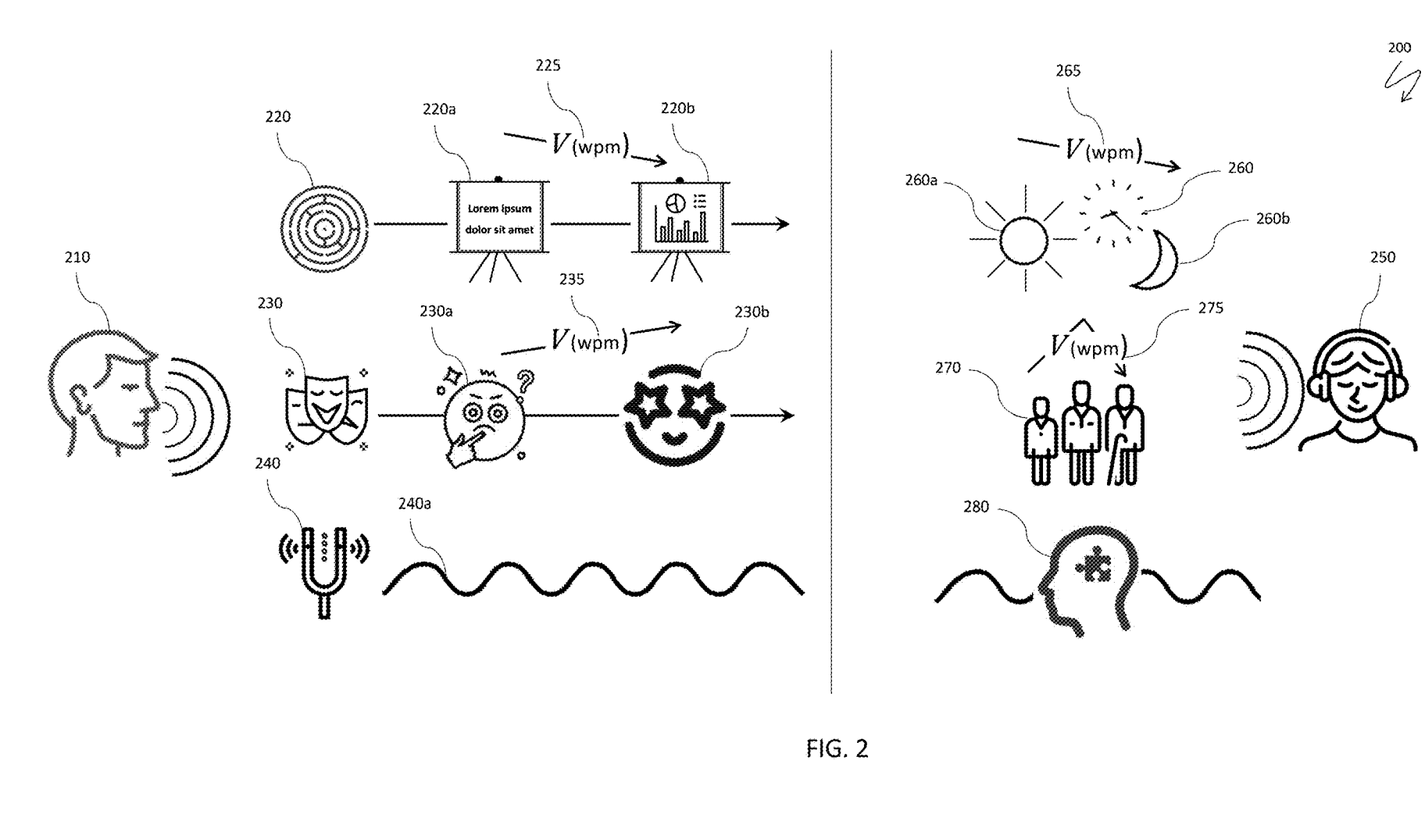
FIG. 2 is a schematic illustration of key factors determining speech tempo for a speaker and a listener, according to an embodiment of the system described herein.

FIG. 2 is a schematic illustration 200 of key factors determining speech tempo for a speaker and a listener. Speech tempo variations for a speaker (presenter) 210 are defined by three key factors: complexity (difficulty) 220 of the presentation material, mood (emotional state) 230 of the presenter 210, and individual speech characteristics 240 of the presenter 210 (which are difficult to measure directly and which are not discussed in this section). Thus, switching from a simple textual material 220a to a complex graphical material 220b with diagrams and tables may cause a slowdown 225 of speech tempo of the presenter 210. Conversely, a change from a serious and thoughtful presenter mood 230a to an excited and enthusiastic emotional state 230b may often cause an acceleration 235 of the speech tempo.

A desired speech tempo for a listener 250 may depend on a different set of factors, including time of day 260, age 270, and comprehension level 280. As the time of day 260 progresses from morning/midday 260a to evening/nighttime 260b, the comfortable speech tempo 265 for the listener 250 may decline. An age related optimal talking speed 275 for a listener may increase from young to mature age and subsequently decrease toward the senior age. The comprehension level 280 may be measured based of facial expression, eye-tracking and other technologies, as explained elsewhere herein.

Figure 3:
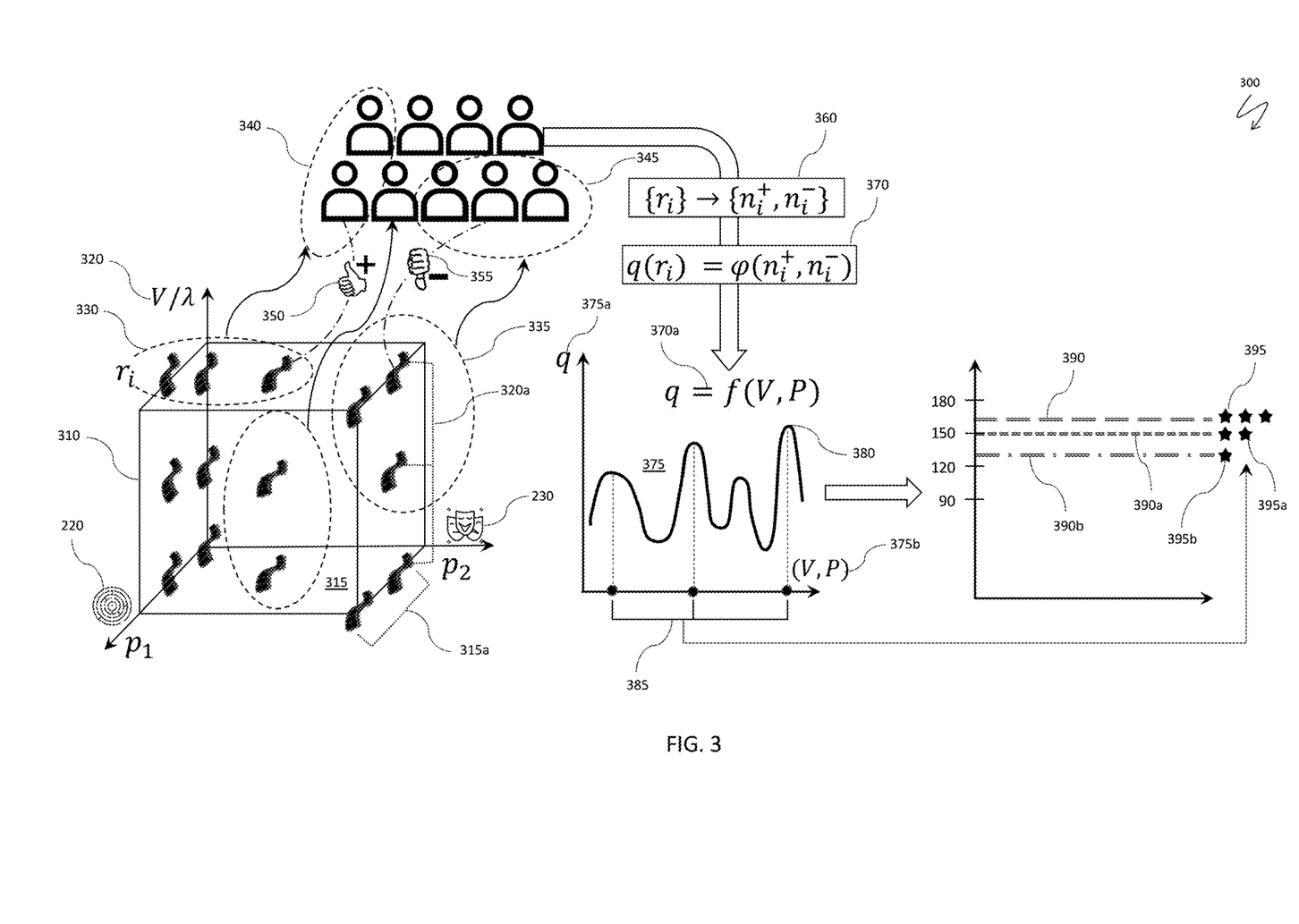
FIG. 3 is a schematic illustration of an experimental design and optimization of adjustment levels for speech tempo, according to an embodiment of the system described herein.

FIG. 3 is a schematic illustration 300 of an experimental design and optimization of adjustment levels for speech tempo. An experimental space is a multi-dimensional parallelepiped 310 with a parameter subspace 315 (in FIG. 3—a two-dimensional rectangle) and an axis for an adjusted speed (or acceleration rate) 320. The parameter subspace 315 may reflect some or all the key factors explained in connection with FIG. 2; two of the factors—presentation complexity 220 and mood 230 of the presenter 210, are shown in FIG. 3.

The experimental design is using quantified values of the parameter subspace 315 and the adjusted speed/acceleration rate 320, as indicated by dotted brackets 315a, 320a. According to an optimal experimental design, a set of experiments 330, 335 ($r_i$), each containing multiple experimental points, is designated for different sets 340, 345 of users who are watching pre-recorded video clips, corresponding to the experimental points (i.e., specific combinations of parameters and acceleration rates). Users may provide reactions 350, 355 reflecting a degree of comfort of the users with each experimental point. Accordingly, the results of each experiment may be described by a tuple 360, indicating a count of positive and negative user assessments. Subsequently, the results may be aggregated into a quality function 370, 370a, reflecting user preferences for various combinations of parameters and speech tempos. A quality graph 375 showing a preference value 375a for combinations 375b may be used to detect local maxima 380 of user preferences and identify several optimal acceleration rates/speech tempos 385 (three local maxima and optimal speech tempos in FIG. 3). The optimal speech tempos are shown as values 390, 390a, 390b on the wpm scale and corresponding scores 395, 395a, 395b reflect values of the quality function for each local maxima on the graph 375.

Figure 4:
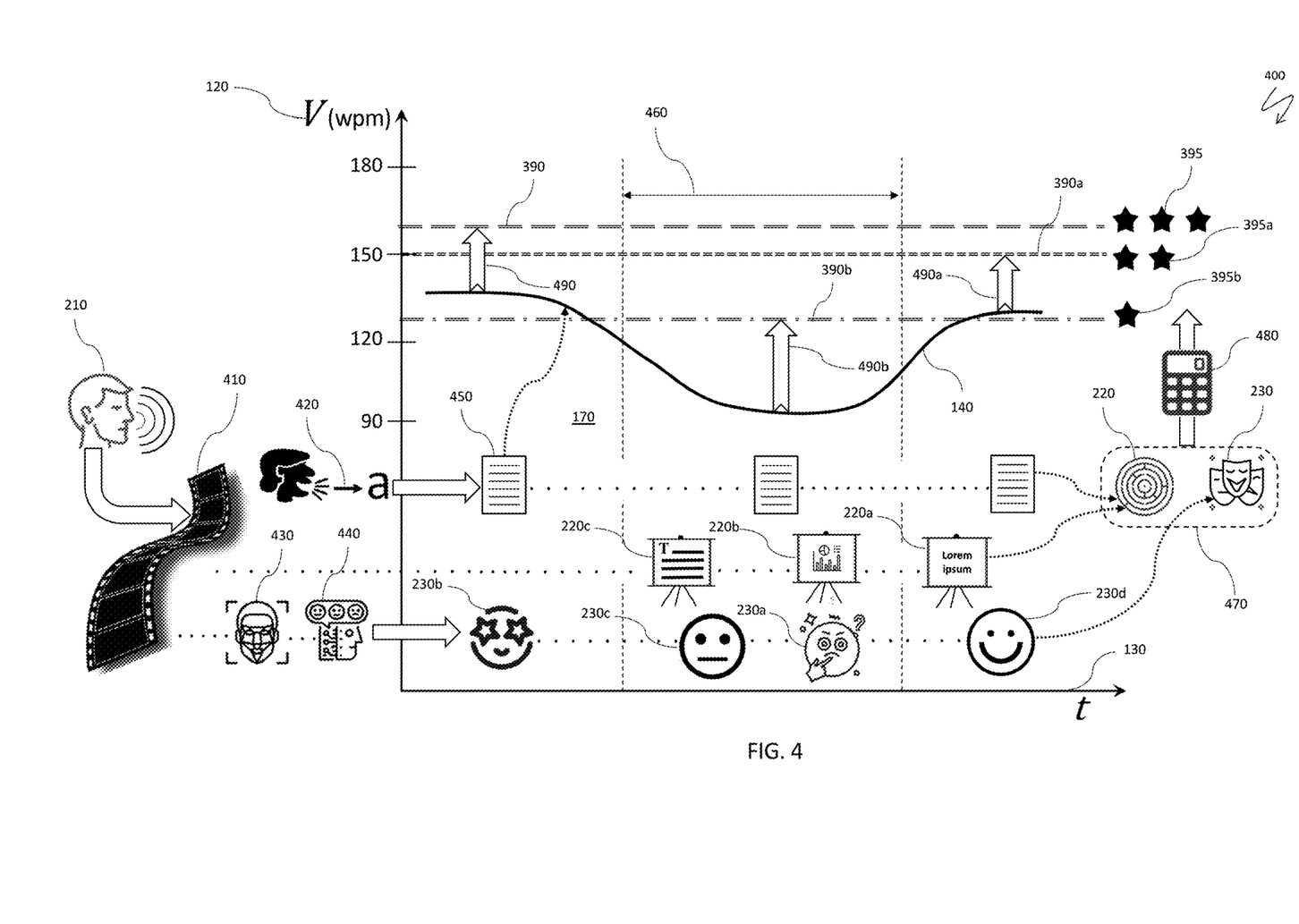
FIG. 4 is a schematic illustration of segmentation of a pre-recorded audio-video presentation and of an automatic adjustment of speech tempo, according to an embodiment of the system described herein.

FIG. 4 is a schematic illustration 400 of the segmentation of a pre-recorded audio-video presentation and of an automatic adjustment of speech tempo of the presentation. The system automatically processes a pre-recorded audio-video presentation 410 produced by the presenter 210 using a technology stack that may include speech recognition 420, facial recognition 430, sentiment recognition 440 and may include other technologies, such as gesture recognition, Natural Language Processing, etc. (not shown in FIG. 4).

The audio-video presentation 410 is assessed by the technology stack and the values of the key factors affecting talking speed of the presenter 210 are assessed in connection with the talking speed graph 170 in the coordinates 120, 130 with the speech tempo curve 140 (see FIG. 1 and the accompanying text). The assessment may include emotional states of the presenter 210, successfully taking the values 230b, 230c, 230a, 230d; visual complexity of the presentation materials 220c, 220b, 220a; and text fragments 450 of speech of the presenter 210 obtained through speech recognition technology 420; readability levels of the recognized text fragments are also calculated, as explained elsewhere herein (see, for example, Section 3 of the Summary).

If the speech tempo curve 140, the values 220a-220c, 230a-230d and/or the readability levels of the recognized text fragments 450 show significant variations, the timeline for the pre-recorded video may be split into segments 460. For each of the segments 460, runtime values of all parameters 220, 230 and the recognized text fragments 450 are aggregated by the aggregation module 470 and used by a scoring engine 480 to detect a segment score corresponding to optimal speech tempo, as explained in connection with FIG. 3. The scores 395, 395a, 395b that are obtained are determining an adjusted constant talking speed for each segment, represented by the values 390, 390b, 390a and generating acceleration rates 490, 490b, 490a (listed in the order of values for subsequent segments in FIG. 4). Each of the acceleration rates 490, 490b, 490a is independent of other ones of the acceleration rates 490, 490b, 490a. A copy of a resulting video with accelerated speech tempo and optional segmentation may be stored next to the original video (not shown in FIG. 4).

Figure 5:
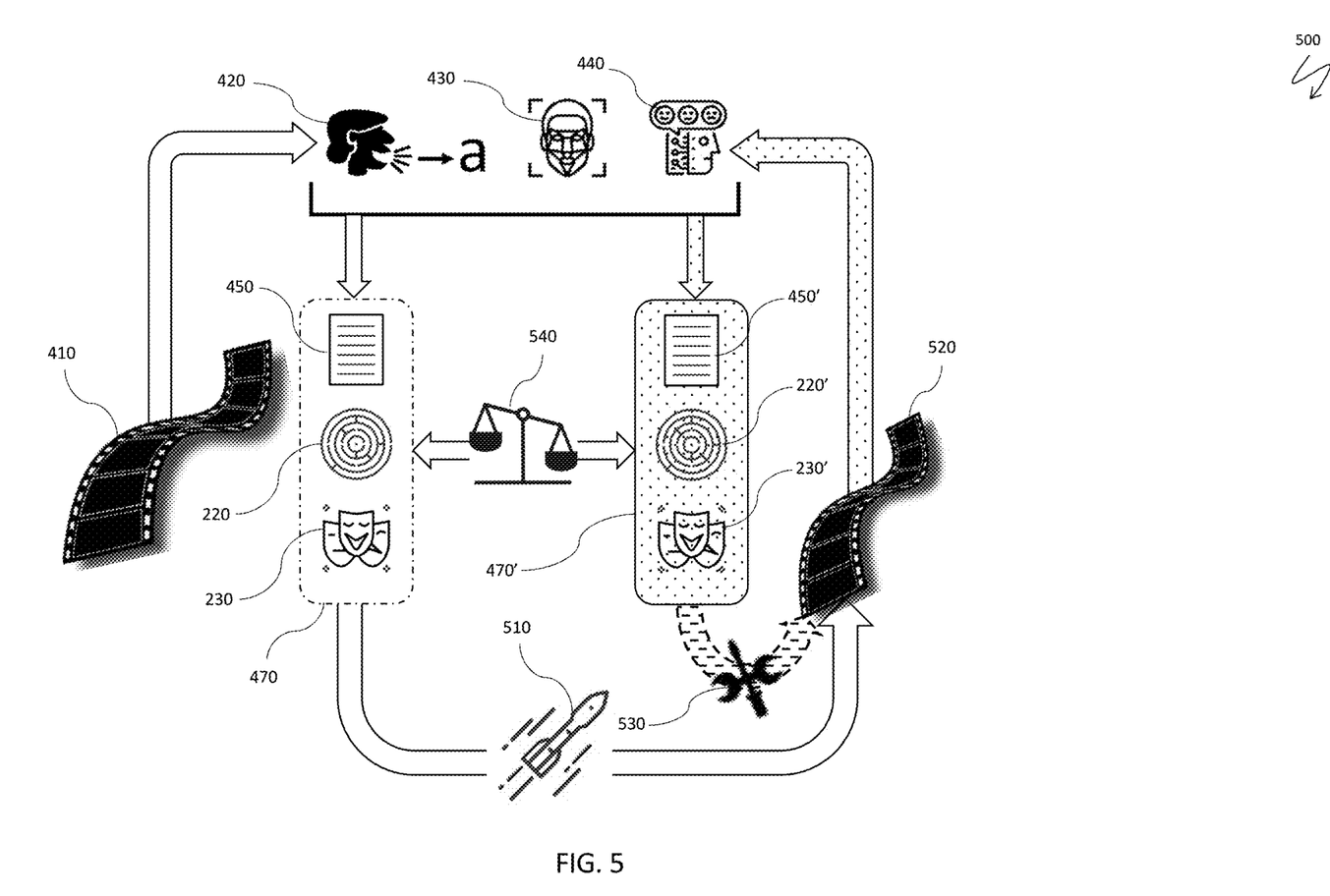
FIG. 5 is a schematic illustration of an iterative consistency test for an adjusted recording, according to an embodiment of the system described herein.

FIG. 5 is a schematic illustration 500 of an iterative consistency test for an adjusted recording. The pre-recorded video 410 is initially processed using the technology stack 420, 430, 440 applied to obtain values of the parameters 220, 230 and the recognized text fragments 450 and which are aggregated in the aggregation module 470 (see FIG. 4 and the accompanying text) to determine acceleration rates 510 along the timeline (with possible segmentation) and produce a resulting video 520 with adjusted talking speeds.

In order to apply an iterative consistency test, the resulting video 520 is processed using the same process as for the pre-recorded video 410, shown in a dot-filled aggregation module 470' with updated parameter values 220', 230', 450'; the parameter values may change because of the adjusted speed tempos in the resulting video 520 may result in different newly adjusted speech tempos, as summarily shown by a processing icon 530.

If consistency metrics 540 between the pre-recorded video 410 and the resulting video 520 is satisfactory, the consistency text is deemed completed and the resulting video 520 is approved; otherwise, additional steps (now shown in FIG. 5) may be necessary.

Figure 6:
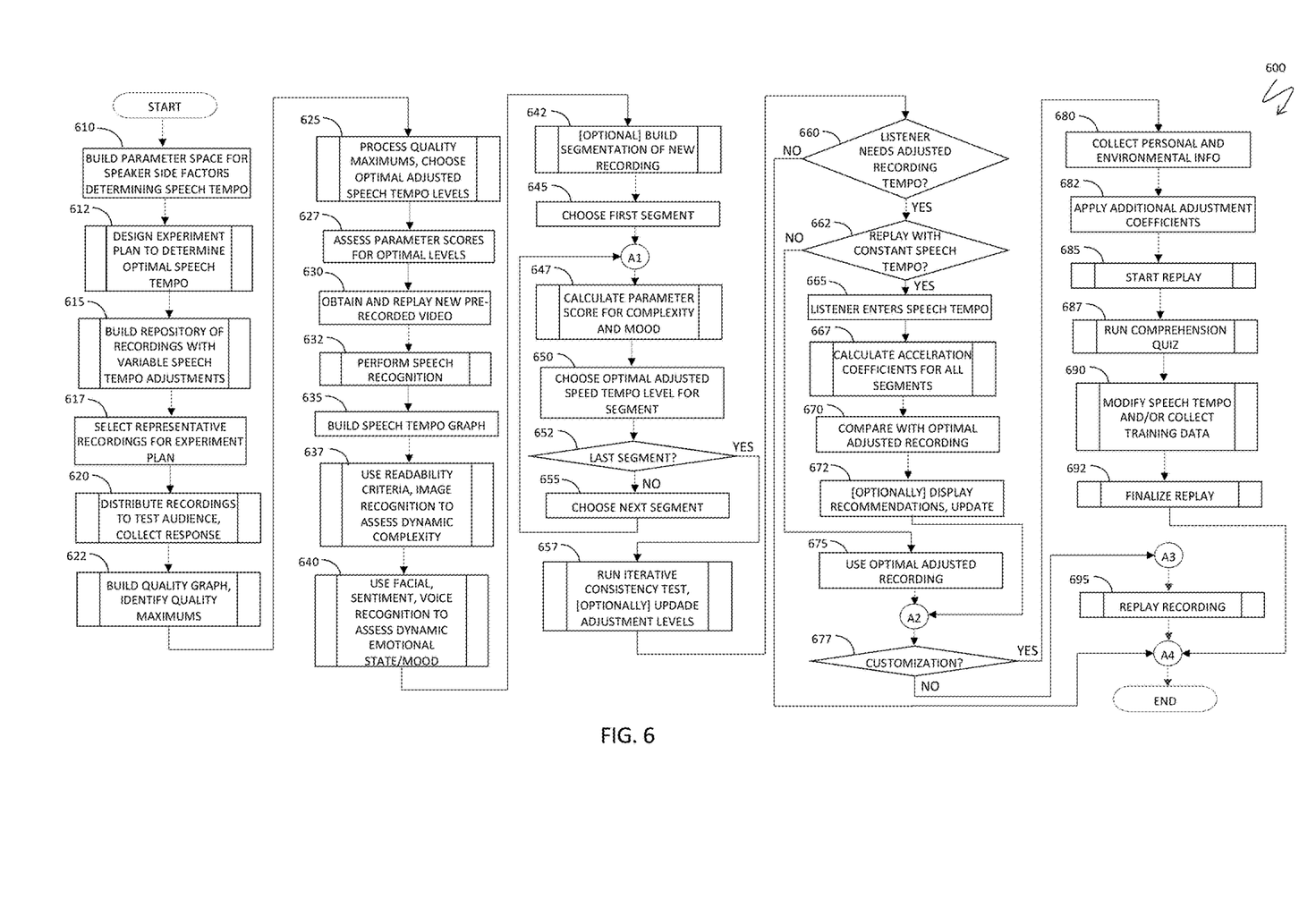
FIG. 6 is a system flow diagram illustrating system functioning in connection with an automatic speech tempo adjustment for a pre-recorded video, according to an embodiment of the system described herein.

Referring to FIG. 6, a system flow diagram 600 illustrates system functioning in connection with an automatic speech tempo adjustment for a pre-recorded video. Processing begins at a step 610, where the system builds a parameter space for speaker side factors determining speech tempo, as explained elsewhere herein (see, for example, FIG. 2 and the accompanying text). After the step 610, processing proceeds to a step 612, where the system designs an experiment plan to determine optimal speech tempo options (see FIG. 3 and the accompanying text). After the step 612, processing proceeds to a step 615, where a video repository of recordings with variable presentation parameters and speech tempo adjustment is built. After the step 615, processing proceeds to a step 617, where a set of representative recordings for the designed experiment plan is chosen from the repository (see FIG. 3 and the accompanying text for explanations). After the step 617, processing proceeds to a step 620, where the recordings are distributed to an audience for testing where user responses are collected. After the step 620, processing proceeds to a step 622, where the system builds a quality graph and identifies local maxima of the quality function (see FIG. 3 for details). After the step 622, processing proceeds to a step 625, where the experimental data corresponding to the quality maxima are processed and the corresponding optimal adjusted speech tempo levels and the corresponding acceleration rates are obtained. After the step 625, processing proceeds to a step 627, where the parameter scores for optimal speech tempo levels are assessed based on the shape of the quality graph.

After the step 627, processing proceeds to a step 630, where a new pre-recorded video presentation is obtained and replayed, as explained elsewhere herein and illustrated in FIG. 4. After the step 630, processing proceeds to a step 632, where speech recognition of the talk of the presenter is performed. After the step 632, processing proceeds to a step 635, where a speech tempo graph is built, as explained elsewhere herein (see, for example, Section 4 of the Summary). After the step 635, processing proceeds to a step 637, where text readability criteria and image recognition applied to presentation visual materials are used to assess the runtime dynamic complexity of the presentation (see Section 3 of the Summary). After the step 637, processing proceeds to a step 640, where facial, sentiment and voice recognition are used to assess dynamic emotional state (mood) of the presenter. After the step 640, processing proceeds to an optional step 642, where the pre-recorded presentation is segmented in case when complexity and talking speed of the pre-recorded presentation are experiencing significant swings (as explained in FIG. 4 and the accompanying text).

After the step 642, processing proceeds to a step 645, where the first segment is chosen. After the step 645, processing proceeds to a step 647, where the score of previously assessed parameters, such as presentation complexity and mood of the presenter, is built (see FIG. 4 and the accompanying text). After the step 647, processing proceeds to a step 650, where an optimal adjusted speed tempo level is chosen for the current segment of the pre-recorded presentation based on the assessed score, as explained elsewhere herein (see, for example, FIG. 3 and the accompanying text). After the step 650, processing proceeds to a test step 652, where it is determined whether the current segment is the last segment of the pre-recorded video presentation. If not, processing proceeds to a step 655, where the next segment is chosen. After the step 655, processing proceeds back to the step 647, discussed above, which may be independently reached from the step 645. If it is determined at the test step 652 that the current segment is the last segment of the presentation, processing proceeds to a step 657, where an iterative consistency test is performed to the adjusted presentation, obtained at the steps 630, 632, 635, 637, 640, 642, 645, 647, 650, 655, discussed above, and the adjustment levels for the speed tempo are additionally updated, as explained elsewhere herein (see FIG. 5 and the accompanying text). Note that if the presentation includes only one segment, the test step 652 and the step 655 are not performed.

After the step 657, processing proceeds to a test step 660, where it is determined whether a listener needs adjustments to speech tempo of the original recording. If not, processing is complete; otherwise, processing proceeds to a test step 662, where it is determined whether the listener desires a replay with a constant speed tempo. If so, processing proceeds to a step 665, where the listener enters a desired speech tempo. After the step 665, processing proceeds to a step 667, where the talk speed acceleration rates (coefficients) are calculated for all segments. After the step 667, processing proceeds to a step 670, where the suggested presentation is compared with an optimal adjusted recording created at the steps 630, 632, 635, 637, 640, 642, 645, 647, 650, 655, 657. After the step 670, processing proceeds to an optional step 672, where the system displays recommendations and may automatically update a recording created with a desired speed tempo of the listener.

After the step 672, processing proceeds to a test step 677, where it is determined whether an additional customization of the current recording is required (aimed at considering additional environmental info and preferences of the listener). If not, processing proceeds to a step 695, where the recording is replayed without further changes; after the step 695, processing is complete. If it is determined at the test step 677 that an additional customization of the current recording is required, processing proceeds to a step 680, where personal info of the listener and environmental info is collected. After the step 680, processing proceeds to a step 682, where additional adjustment coefficients to the talking speed are applied, considering the additional data collected at the step 680. After the step 682, processing proceeds to a step 685, where the replay of the adjusted pre-recorded video presentation is started. After the step 685, processing proceeds to a step 687, where the system runs a comprehension quiz for the listener. After the step 687, processing proceeds to a step 690, where the speech tempo is modified according to the results of the test quiz. Additionally, or alternatively, training data related to the listener may be collected and stored. After the step 690, processing proceeds to a step 692, where the replay started at the step 685 is finalized. After the step 692, processing is complete.

If it is determined at the test step 662 that the replay with a constant listener chosen speech tempo is not required, processing proceeds to a step 675, where the optimal adjusted recording built at the steps 630, 632, 635, 637, 640, 642, 645, 647, 650, 655, 657 is used. After the step 675, processing proceeds to the test step 677, discussed above, which may be independently reached from the step 672.

Figure 7:
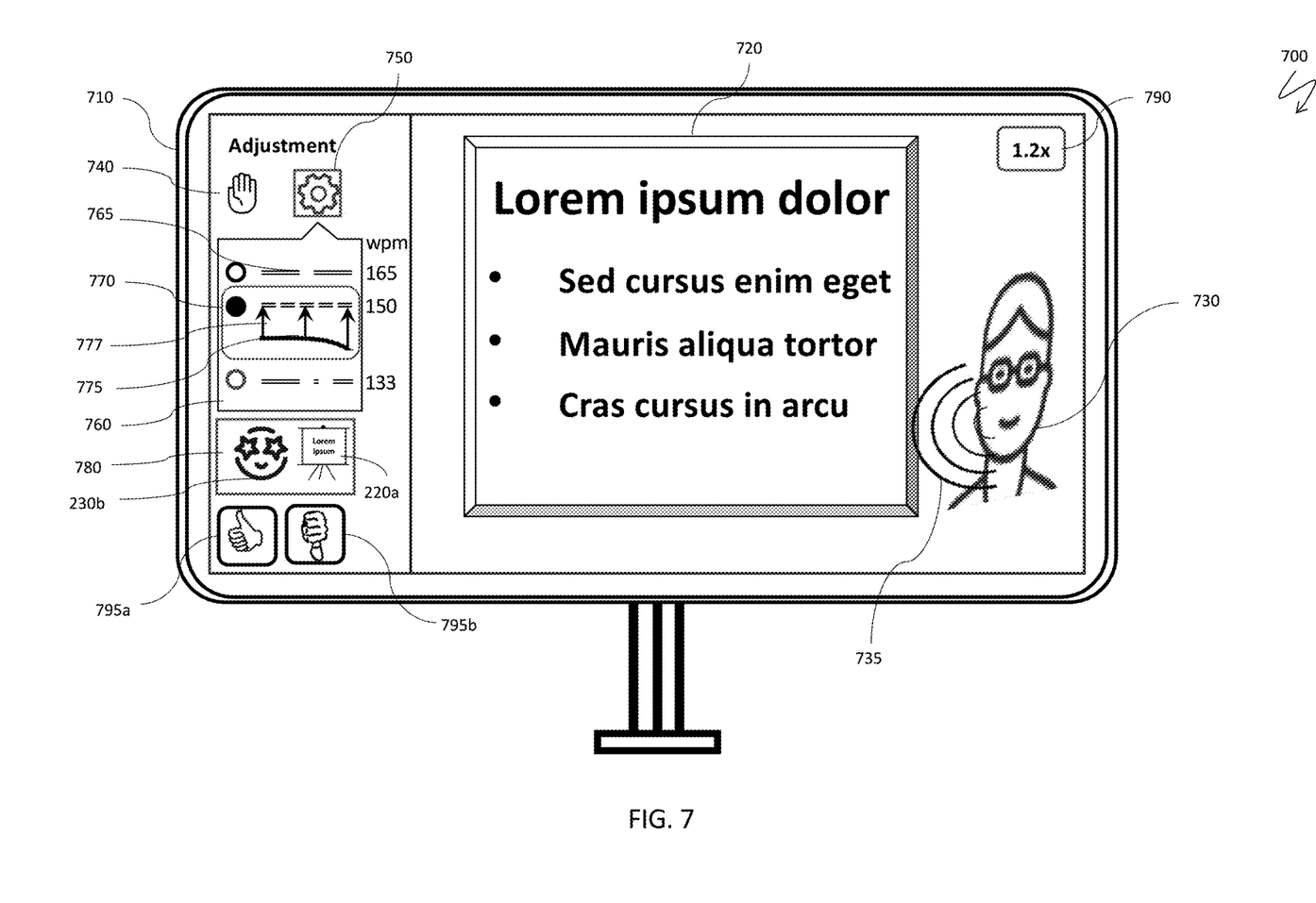
FIG. 7 is a schematic illustration of the user interface for speech tempo adjustment, according to an embodiment of the system described herein.

FIG. 7 is a schematic illustration 700 of a user interface for speech tempo adjustment. A computer screen 710 displays a pre-recorded presentation 720 given by a presenter 730. A talk of the presenter 720 is symbolically illustrated by an audio wave 735. A user interface for the speech tempo adjustment is shown in the left portion of the screen and includes an adjustment mode, which can be manual 740 or automatic 750. In FIG. 7, an automatic mode 750 is employed; the toolbox 760 of the automatic adjustment interface includes the set of optimal adjusted talking speed levels 765 (explained in connection with FIGS. 3, 4), an optimal speech tempo 770 for a current presentation segment 775, and acceleration rates (coefficients) 777. A notification (information) box 780 may include values of the key factors used in determining the optimal current talking speed, such as visual complexity 220*a* of a presentation segment and the emotional state 230*b* of the presenter 710 while presenting the segment. Additionally, the current acceleration rate is shown on the screen as the item 790.

The computer screen 710 also includes a pair of buttons 795*a*, 795*b* which may be actuated by the user either directly on the computer screen 710 (in the case of a touch screen device) or indirectly using a mouse, track pad, keyboard, or other input device. The buttons 795*a*, 795*b* allow the user to provide feedback (reactions) either during a replay of a modified presentation (as explained, for example, in FIG. 4) or in connection with conducting an experimental design and optimization of adjustment levels for speech tempo (see, for example, FIG. 3 and the corresponding description). In the embodiment shown in FIG. 7, feedback is provided by the user in the form of a binary thumbs-up response (the button 795*a*) or thumbs-down response (the button 795*b*).

However, as described elsewhere herein, it is also possible to use a more nuanced scale of preferences.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: iOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of setting a replay speed of a pre-recorded video presentation, comprising:
   determining a mood of a presenter of the pre-recorded video presentation;
   determining complexity of material that is presented in the pre-recorded video presentation; and
   setting a replay speed based on the mood of the presenter and the complexity of the material that is presented, wherein measuring the mood of the presenter is based on at least one of: facial recognition, sentiment recognition, and gesture recognition; and
   accelerating the replay speed in response to the presenter changing from a serious and thoughtful mood to an excited and enthusiastic emotional state.

2. A method of setting a replay speed of a pre-recorded video presentation, comprising:
   determining a mood of a presenter of the pre-recorded video presentation;
   determining complexity of material that is presented in the pre-recorded video presentation; and
   setting a replay speed based on the mood of the presenter and the complexity of the material that is presented, wherein the replay speed is optimized according to feedback from a plurality of users playing one or more test video presentations at a plurality of replay speeds and wherein the replay speed is optimized using an experimental space that is a multi-dimensional parallelepiped with a parameter subspace and an axis for revised values of the replay speed.

3. The method of claim 2, further comprising:
   adjusting the replay speed based on determining a desired speech tempo for a listener.

4. The method of claim 3, wherein the desired speech tempo is the listener is based on at least one of: time of day, age of the listener, and comprehension level of the listener.

5. The method of claim 4, wherein measuring the comprehension level of the listener is based on at least one of: facial expressions of the listener, eye-tracking of the listener, and listener comprehension quizzes.

6. The method of claim 2, wherein the parameter space corresponds to the mood of the presenter of the pre-recorded video presentation and the complexity of the material.

7. The method of claim 6, wherein the plurality of users is presented with different combinations of replay speeds, material complexity, and presenter moods.

8. The method of claim 7, wherein the feedback from the plurality of users is aggregated into a quality function that represents preferences of the users for various combinations of replay speeds, material complexity, and presenter moods.

9. The method of claim 2, wherein the listener chooses whether to replay the pre-recorded video presentation at a constant acceleration or at the replay speed that is set based on the feedback from the plurality of users.

10. The method of claim 2, further comprising:
    adjusting the replay speed based on at least one of: timber of speech of the presenter, intelligibility of the speech of the presenter, and intonation of the speech of the presenter.

11. A method of setting a replay speed of a pre-recorded video presentation, comprising:
    determining a mood of a presenter of the pre-recorded video presentation;
    determining complexity of material that is presented in the pre-recorded video presentation; and
    setting a replay speed based on the mood of the presenter and the complexity of the material that is presented, wherein the replay speed is iteratively reset according to the mood of the presenter and the complexity of the material that is presented until an integrated consistency criteria is met.

12. The method of claim 11, wherein the complexity of the material that is presented in the pre-recorded video presentation is based on at least one of: readability criteria for recognized text of the presentation, complexity of visual portions of the presentation, and intensity of interaction of the presenter with the visual portions of the presentation.

13. The method of claim 11, wherein the pre-recorded video presentation is divided into a plurality of segments and wherein each of the segments is provided with a replay speed that is independent of a replay speed of different ones of the segments.

14. The method of claim 13, wherein the segments are determined based on a relationship between an actual speech tempo of the presenter, an emotional state of the presenter and the complexity of the material that is presented.

15. The method of claim 14, wherein the actual speech tempo of the presenter is determined using a sliding average window having a width between 20 seconds and 30 seconds.

16. The method of claim 11, further comprising:
    adjusting the replay speed based on at least one of: timber of speech of the presenter, intelligibility of the speech of the presenter, and intonation of the speech of the presenter.

17. The method of claim 11, wherein the integrated consistency criteria is based, at least in part, on at least one of: a percentage of newly misrecognized words, an overall drop in speech recognition accuracy, and deviation in recognized emotional states.

18. A non-transitory computer readable software medium containing software that sets a replay speed of a pre-recorded video presentation, the software comprising:
   executable code that determines a mood of a presenter of the pre-recorded video presentation;
   executable code that determines complexity of material that is presented in the pre-recorded video presentation;
   executable code that sets a replay speed based on the mood of the presenter and the complexity of the material that is presented, wherein measuring the mood of the presenter is based on at least one of: facial recognition, sentiment recognition, and gesture recognition; and
   executable code that accelerates the replay speed in response to the presenter changing from a serious and thoughtful mood to an excited and enthusiastic emotional state.

19. A non-transitory computer readable software medium containing software that sets a replay speed of a pre-recorded video presentation, the software comprising:
   executable code that determines a mood of a presenter of the pre-recorded video presentation;
   executable code that determines complexity of material that is presented in the pre-recorded video presentation; and
   executable code that sets a replay speed based on the mood of the presenter and the complexity of the material that is presented, wherein the replay speed is iteratively reset according to the mood of the presenter and the complexity of the material that is presented until an integrated consistency criteria is met.

20. The non-transitory computer readable software medium of claim 19, wherein the integrated consistency criteria is based, at least in part, on at least one of: a percentage of newly misrecognized words, an overall drop in speech recognition accuracy, and deviation in recognized emotional states.

\* \* \* \* \*